(12) United States Patent
Wanek et al.

(10) Patent No.: US 6,609,860 B2
(45) Date of Patent: Aug. 26, 2003

(54) HAND MACHINE TOOL WITH DEPTH STOP

(75) Inventors: Helmut Wanek, Bietigheim-Bissingen (DE); Markus Heckmann, Filderstadt (DE)

(73) Assignee: Robert Bosch GmbH, Stuttgart (DE)

( * ) Notice: Subject to any disclaimer, the term of this patent is extended or adjusted under 35 U.S.C. 154(b) by 7 days.

(21) Appl. No.: 09/936,472

(22) PCT Filed: Dec. 1, 2000

(86) PCT No.: PCT/DE00/04279

§ 371 (c)(1),
(2), (4) Date: Sep. 13, 2001

(87) PCT Pub. No.: WO01/58630

PCT Pub. Date: Aug. 16, 2001

(65) Prior Publication Data

US 2002/0159847 A1 Oct. 31, 2002

(30) Foreign Application Priority Data

Feb. 10, 2000 (DE) .......................................... 100 06 042

(51) Int. Cl.[7] .............................................. B23B 45/00
(52) U.S. Cl. ........................... 408/14; 16/426; 408/113; 408/241 S
(58) Field of Search ........................... 408/14, 113, 114, 408/202, 241 S; 173/21; 16/426

(56) References Cited

U.S. PATENT DOCUMENTS

| | | | | |
|---|---|---|---|---|
| 1,929,585 A | * | 10/1933 | Henry | 408/113 |
| 2,978,931 A | * | 6/1961 | Broden | 408/113 |
| 3,456,740 A | * | 7/1969 | Paule et al. | 173/109 |
| 3,537,336 A | * | 11/1970 | Schmuck | 408/72 R |
| 3,633,682 A | * | 1/1972 | Moores, Jr. | 173/46 |
| 3,779,663 A | * | 12/1973 | Ruggles | 408/113 |
| 4,113,404 A | * | 9/1978 | Lippacher et al. | 408/241 S |
| 4,256,422 A | * | 3/1981 | Theissig et al. | 408/241 S |
| 4,276,675 A | * | 7/1981 | Pioch | 16/426 |
| 4,354,779 A | * | 10/1982 | Vaughan | 408/241 S |
| 4,368,556 A | * | 1/1983 | Wanner et al. | 16/436 |
| 4,820,090 A | * | 4/1989 | Chen | 408/241 R |
| 4,881,294 A | * | 11/1989 | Riedl | 16/426 |
| 5,049,012 A | * | 9/1991 | Cavedo | 408/241 R |
| 5,690,451 A | * | 11/1997 | Thurler et al. | 408/113 |
| 5,918,685 A | * | 7/1999 | Ulbrich et al. | 173/4 |

FOREIGN PATENT DOCUMENTS

| | | | | |
|---|---|---|---|---|
| DD | DL-234814 A | * | 4/1986 | 408/241 S |
| DE | 28 32 429 A | | 2/1980 | |
| DE | 2918586 A | * | 11/1980 | 408/14 |
| DE | 3214182 A | * | 10/1983 | 408/241 S |
| DE | 36 32 377 A | | 3/1988 | |
| DE | 3639281 A1 | * | 5/1988 | 408/241 S |
| GB | 2165480 A | * | 4/1986 | 408/241 S |
| GB | 2 288 757 A | | 11/1995 | |
| JP | 227306 A | * | 12/1984 | 408/241 S |
| JP | 188612 A | * | 8/1987 | 408/241 S |

\* cited by examiner

*Primary Examiner*—Daniel W. Howell
(74) *Attorney, Agent, or Firm*—Michael J. Striker

(57) ABSTRACT

A manual machine tool (10) with a housing (12) that carries an adjustable bit stop (32), particularly on a supplemental handle (28), becomes more convenient and safer to operate because the bit stop (32) can be fixed in positive fashion, particularly in latching fashion, next to the manual machine tool (10).

4 Claims, 4 Drawing Sheets

HAND MACHINE TOOL WITH DEPTH STOP

RELATED ART

The invention is based on a manual machine tool according to the preamble of claim 1.

Manual machine tools, particularly manual boring machines and hammer drills, having a bit stop that can be attached to the neck of the housing are known, by means of which holes can be bored with a depth limitation that can be adjusted approximately identically. To adjust the bit stop to a desired extent using the known manual machine tools, a clamping bolt must be loosened, so that the rod-shaped bit stop can be adjusted in its longitudinal guide. The clamping bolt must then be tightened in its selected adjusted position in order to prevent the adjusted position from changing unintentionally, whereby the loosening and tightening of the clamping bolt is time-consuming, complicated and, due to the non-positive manner of fastening, unstable.

ADVANTAGES OF THE INVENTION

The manual machine tool according to claim 1 has the advantage that the bit stop can be adjusted conveniently and quickly without having to support the manual machine tool on a base.

Additionally, the position of the bit stop is more stable as a result of its positive fixation, because it is more difficult to move unintentionally.

DRAWING

The invention is described in greater detail below using a design example with an accompanying diagram.

Figure 1:
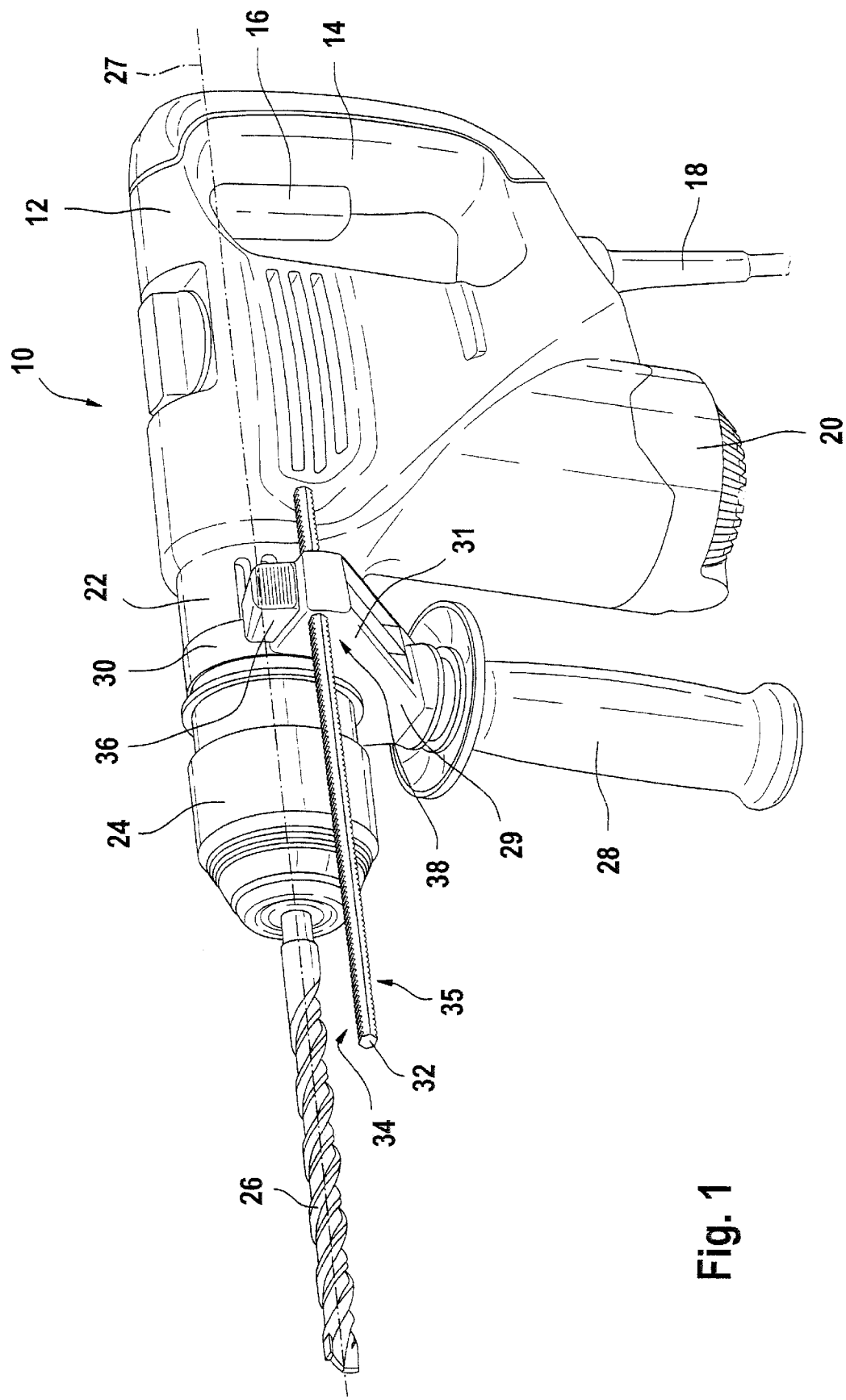
Figure 2:
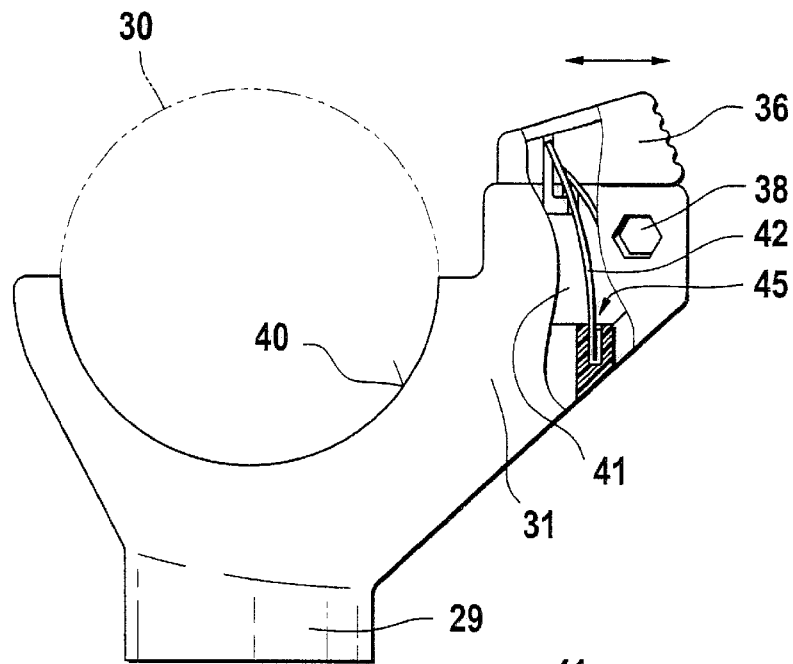
Figure 3:
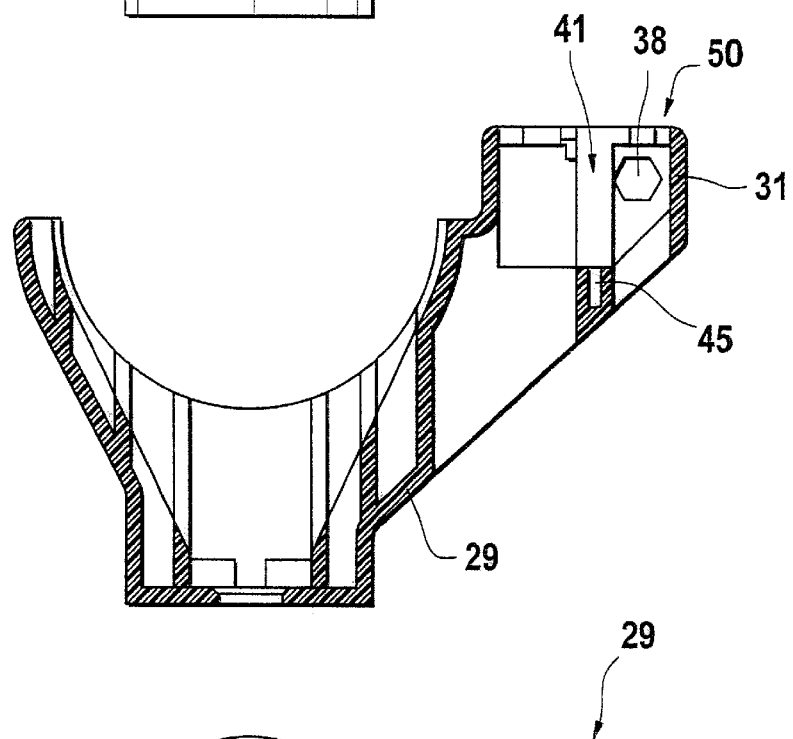
Figure 4:
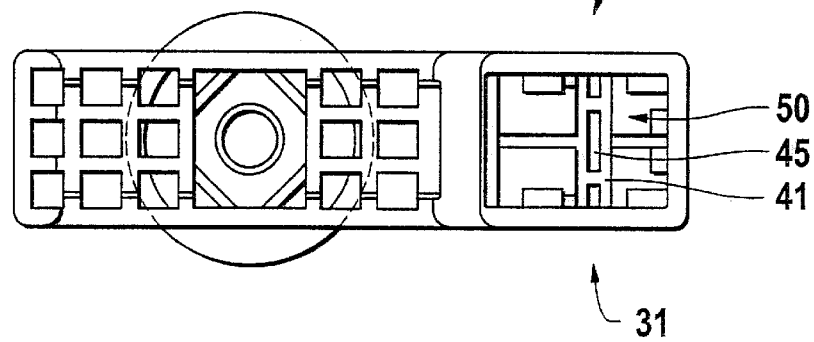
Figure 5:
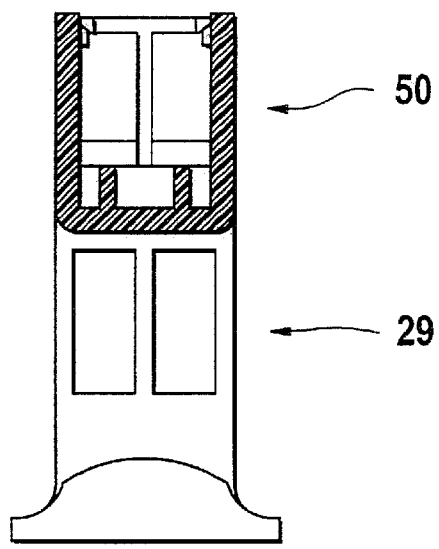
Figure 6:
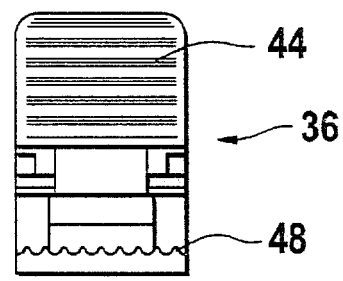
Figure 7:
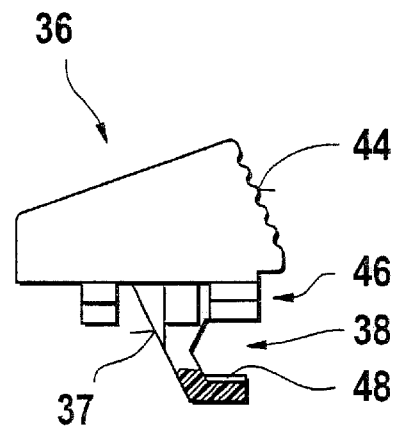
Figure 8:
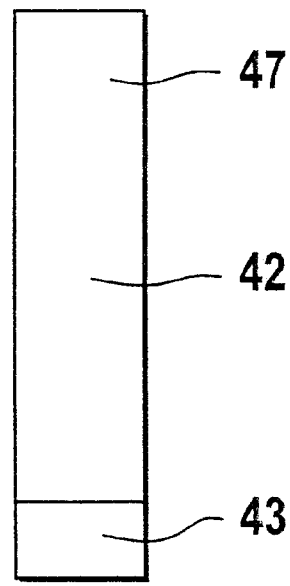
Figure 9:
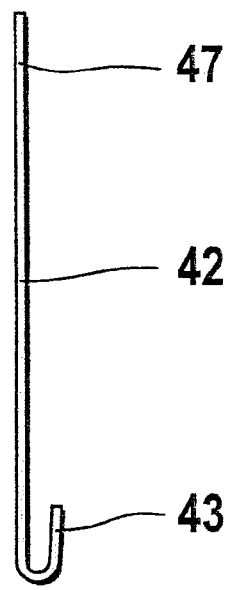

FIG. 1 shows a spacial representation of a hammer drill with bit stop according to the invention, FIG. 2 shows a top view of the extension of the supplemental handle with sliding push-button, FIG. 3 shows a cross-section of the extension of the supplemental handle, FIG. 4 shows a top view of the extension of the supplemental handle, FIG. 5 shows a longitudinal view of the extension of the supplemental handle, FIG. 6 shows a top view of the sliding push-button, FIG. 7 shows a side view of the sliding push-button, FIG. 8 shows a top view of the leaf spring, and FIG. 9 shows a side view of the leaf spring.

DESCRIPTION OF THE DESIGN EXAMPLE

FIG. 1 shows a spacial representation of a manual machine tool 10 designed as a hammer drill in the view from the front left. The manual machine tool has a housing 12 with a handle 14 designed as a spade handle that contains a switching key 16 out of which an electrical cord 18 extends downward to supply power to the motor-which is not shown-inside a motor housing 20 belonging to the housing 12. The motor housing 20 is arranged in a U-bend at a right angle to a longitudinal axis 27 of the manual machine tool 10. The longitudinal axis 27 is defined by a machine neck 22, a clamping chuck 24, and an insert tool 26 designed as a bit.

A supplemental handle 28 also extends at a right angle downward from the longitudinal axis 27, which is supported on the machine neck 22 in detachable fashion by means of a tightener 30.

The supplemental handle 28 contains an upper extension 29 with a concave, radial support surface 40, which is intended for placement against the machine neck 22 and which provides stable support for the supplemental handle 29 against the housing 12.

On both sides of the concave, radial support surface 40, the upper extension 29—as viewed from the front—forms two arms, only the larger support arm 31 of which is shown in greater detail. A hexagon rod-shaped bit stop 32 is supported in a hexagon bore-shaped longitudinal guide 38 in a fashion that secures it against rotation and allows it to be moved longitudinally. The bit stop 32 has an upper and a lower tooth profile 34, 35 on opposing hexagon surfaces, with which it is held fast in positive, removeable fashion in the longitudinal guide 38.

The support arm 32 carries a push-button 36 supported in moveable fashion on its free end. This is secured against falling out by way of retaining bases 46 in a dovetail-shaped longitudinal guide 50 of the free end of the support arm 31.

A central recess 42 designed in the shape of a blind hole for accommodating a leaf spring 42 is situated inside the support arm 32, and the leaf spring 42 is supported in it in a fashion that allows it to swing horizontally. The lower end 43 of the leaf spring 42 is inserted and clamped in removeable fashion in a clamping slot provided in the recess 41. The leaf spring 42, which is bent on the bottom and clamped there, rests with its top end 47 against a diagonal contact surface 44 of the push-button 36, so that it can be moved elastically back and forth in a lateral direction.

The longitudinal guide 38 for accommodating the bit stop 32 in the support arm 31 continues in the lower section of the push-button 36 as an aligning longitudinal opening which is open on the side, the lower, U-arm-shaped section of which has a counter-tooth profile 48 inside that is adapted to the tooth profiles 34, 35 of the bit stop 32, and which can be brought into positive contact with them.

The push-button 36 with its counter-tooth profile 48 is held in contact with the hexagon rod-shaped bit stop 32 by way of the pretensioned leaf spring 42, so that it is fixed immoveably in this position on the supplemental handle 28 in positive fashion.

By pressing the push-button 36, its counter-toothing 48 is released from the tooth profile 35 of the bit stop 36 facing it. As soon as the push-button 36 is released, its counter-toothing 48 locks in the tooth profile 35 of the bit stop 36 and holds it tightly.

What is claimed is:

1. Manual machine tool (10) with a housing (12) that carries an adjustable bit stop (32) on a supplemental handle (28), the bit stop having an upper and a lower tooth profile on opposing hexagonal surfaces, characterized in that the bit stop (32) can be fixed in positive fashion next to the manual machine tool (10), wherein a positive position of the bit stop (32) can be locked in place in releasable, latching fashion using an operating element designed as a sliding push-button (36), the push-button having a counter-tooth profile, wherein said counter-tooth profile is adapted to fit the tooth profiles of the bit stop and positively engage said tooth profiles, wherein the supplemental handle (28) carries the sliding push-button (36) and a longitudinal guide (38) for the bit stop (32) on a top surface of the supplemental handle.

2. The manual machine tool according to claim 1, wherein said push-button is secured against falling out by a retaining base.

3. The manual machine tool according to claim 1, wherein said supplemental handle includes at least one support arm, said at least one support arm having a recess for accommodating a leaf spring, wherein said leaf spring is supported in said recess in a fashion that allows said leaf spring to swing horizontally.

4. The manual machine tool according to claim 1, wherein the bit stop is hexagonal and is supported in a hexagonal bore-shaped longitudinal guide.

* * * * *